Aug. 29, 1967  A. E. BARNES  3,338,134
ELECTROMOTIVE FORCE ROCKET MOTOR INITIATOR
Filed Dec. 27, 1965  2 Sheets-Sheet 1

AMOS E. BARNES INVENTOR.

BY

ATTORNEY

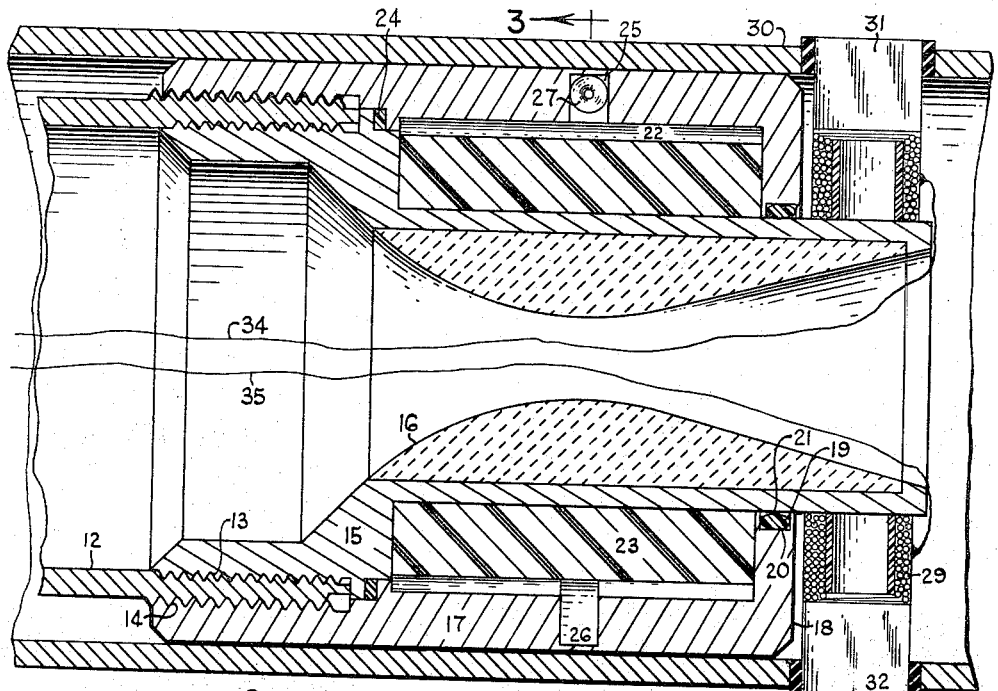
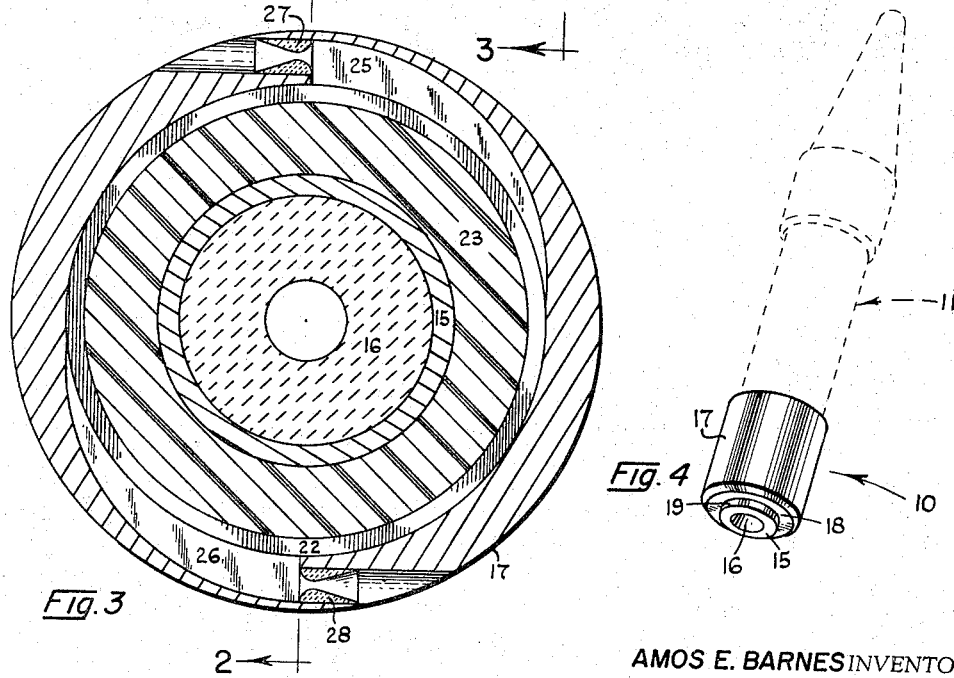

United States Patent Office 3,338,134
Patented Aug. 29, 1967

3,338,134
ELECTROMOTIVE FORCE ROCKET MOTOR INITIATOR
Amos E. Barnes, Huntsville, Ala., assignor to Thiokol Chemical Corporation, Bristol, Pa., a corporation of Delaware
Filed Dec. 27, 1965, Ser. No. 516,557
4 Claims. (Cl. 89—1.808)

This invetnion relates to improvements in rocket motor initiators and more particularly to the use of an electromotive force derived from the rotation or spin of the rocket motor to initiate an igniter to ignite the solid propellant fuel within a rocket motor.

There is a great need at the present time to provide a rocket motor that will, before it is launched, be subjected to a spinning action at high velocity about its longitudinal axis. Such spinning action being created to maintain the rocket motor stable and prevent it from veering or tumbling during flight.

Such rocket motors are spin stabilized for accuracy and are known as free flight rocket motors in the artillery and ammunition category. It has been found, however, that greater accuracy will be obtained with such rocket motors if a predetermined spin thereof is accomplished prior to the ignition of the solid propellant in the rocket motor or while the rocket motor is still within the launcher.

The rocket motor of the instant invention is self controlled, thus, there is no requirement for additional controls for the ignition of the rocket motor, that could include electrical systems or the like that are separate and detached from the rocket motor.

It is therefore an object of this invention to provide an initiator for a rocket motor that will ignite the solid propellant within the rocket motor after the motor has attained a desired spin rate and as the result of such spinning.

With the above objects and advantages in view, it is believed that others will appear from a study of the description when taken in connection with the accompanying drawings, in which:

FIGURE 2 is an enlarged fragmentary sectional view, partly broken away, of the initiator embodying the invention and taken approximately on the line 2—2 of FIGURE 3;

FIGURE 3 is a transverse sectional view of the initiator with parts removed on the line 3—3 of FIGURE 2; and FIGURE 4 is a perspective view on a reduced scale of the initiator embodying the instant invention as it is mounted on a suitable rocket motor that is shown in dotted lines.

Figure 1:
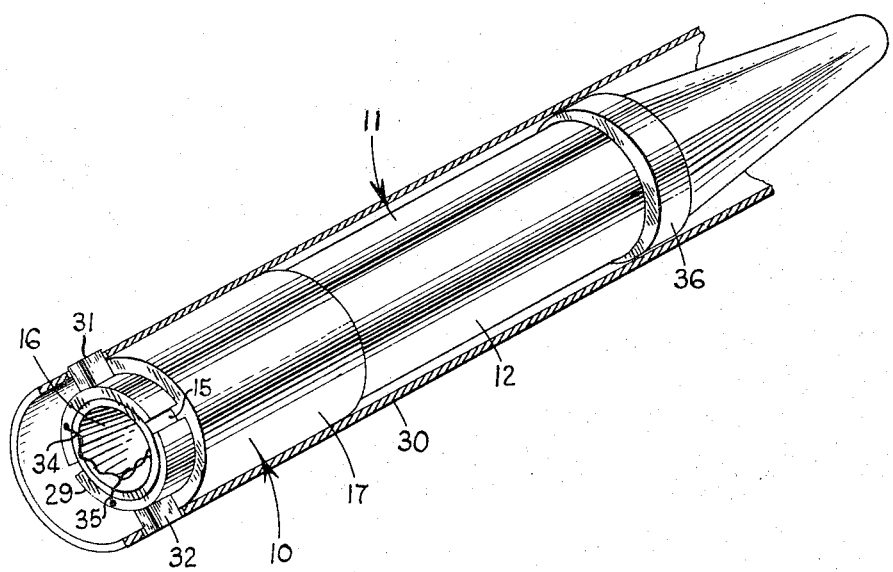
FIGURE 1 is a perspective view, partly in section and partly broken away, showing a rocket motor, on which an initiator embodying the instant invention is installed, positioned in a suitable launcher.

Referring more in detail to the drawings, wherein like parts are designated by like reference numerals, the reference numeral 10 is used to generally designate an electromotive force initiator embodying the invention that is used in conjunction with a suitable rocket motor 11.

The rocket motor 11 includes a motor case 12 which is provided at its aft end with internal threads 13 and external threads 14 and a nozzle 15, having a conventional heat resistant throat insert 16 positioned therein, is detachably connected to the motor case 12 through the medium of the internal threads 13.

The initiator 10 comprises a tubular body member 17 which is detachably connected to the external threads 14 of the motor case 12 in circumjacent parallel relation to the nozzle 15 and the body member 17 has a closed aft end 18 which is provided with a centrally disposed opening 19 through which extends the aft end of the nozzle 15, an annular groove 20 defines the opening 19, being in circumjacent relation therewith and an annular gasket 21 positioned in the groove 20 seals the contacting surfaces of the closed end 18 defining the opening 19 and the nozzle 15.

The body member 17 is provided with a combustion chamber 22 and positioned therein, in contact with the outer surface of the nozzle 15, but spaced from the inner surface of the body member 17, is an annular ring of solid propellant fuel 23 and an annular gasket 24 positioned intermediate of the body member 17 and the nozzle 15 seals the forward end of the combustion chamber 22.

A pair of exhaust ducts 25 and 26 are also provided in the body member 17 and the ducts 25 and 26 are arranged in tangential divergent relation to the combustion chamber 22 and in communication therewith. The ducts 25 and 26 exhaust outwardly of the body member 17 and heat resistant nozzle throat inserts 27 and 28 are positioned in the ducts 25 and 26 at the outer ends thereof within the outer peripherial surface of the body member 17. Viewing FIGURE 3, it will be seen that the forward ends of the ducts 25 and 26 are aligned along one transverse axis of the body member 17 and the aft ends of the ducts 25 and 26 are aligned along another transverse axis of the body member 17 and they extend in diverging relation to each other from their common transverse axis through their forward ends so that any thrust through the nozzle inserts 27 and 28 will create a spin or torque about the longitudinal axis of the rocket motor 11.

An induction coil 29 is mounted on the aft end of the nozzle 15 outwardly of the closed end 18 of the body member 17 and depending on the material from which the nozzle 15 is fabricated, the coil 29 is suitably secured to the nozzle 15 in fixed relation thereto. It also being understood that the coil 29 may be separated into as many sections as required to develop the desired electromotive force.

The rocket motor 11 is placed in a launcher 30 for firing and to carry out the invention, a pair of permanent magnets 31 and 32 are mounted in the launcher 30 in diametric opposed relation to each other.

The instant invention contemplates the use of an induced electromotive force which is derived from the rotation of a rocket motor to initiate a squib or similar igniter for igniting a solid propellant fuel in the rocket motor. The coil 29 is a multi-turn wire coil similar to an armature of an electric generator. The coil 29 secured, as previously described, to the nozzle 15 will, when incurvilinear motion occurs, due to spin or rotation of the motor 11, pass through the magnetic lines of force that are created by the magnets 31 and 32. These lines of force will be broken by the wire forming the coil 29, thereby inducing an electromotive force in the coil 29. Electrical connections 34 and 35 are extended from the ends of the wire forming the coil 29 to the squib or igniter within the cavity in the propellant in the rocket motor 11, the electric current thus generated will therefore initiate the squib or igniter to ignite the solid propellant fuel in the rocket motor 11.

To achieve rotation of the rocket motor 11, the solid propellant 23 within the body member 17 will be ignited in any conventional manner, no specific igniting means is shown, for there are many ways in which this can be accomplished. The ignition of the solid propellant 23 will cause thrust to be directed through the nozzle inserts 27 and 28 and due to the arrangement of the nozzle inserts 27 and 28, a spin or torque will be transmitted to the rocket motor 11, along the longitudinal axis thereof. When the electromagnetic force, developed by the combination of the coil 29 and magnets 31 and 32, has developed the required electric current to initiate the squib or igniter in the rocket motor 11, the solid propellant fuel therein will be ignited and the rocket motor 11 will be fired from the launcher 30. At this time the rocket motor 11 has acquired the proper rate of rotation or spin that is required to accurately reach its destination. To prevent the rocket motor 11 from wobbling in the launcher 30, a bourrelet 36 is provided on the exterior surface of the motor case 12. The bourrelet 36 is of a size to compensate for the extension of the peripheral surface of the body member 17 beyond the peripheral surface of the motor case 12 and it is in close contact with the interior surface of the launcher 30, but the tolerance therebetween is such that there will be no binding.

The rocket motor 11, therefore, depends upon the spin created by the ignition of the solid propellant 23 to induce an electromotive force in the coil 29 breaking the lines of magnetic force created by the magnets 31 and 32 to initiate, by conductive means through the electrical connections or wires 34 and 35 that are connected to a squib or igniter to ignite the solid propellant in the rocket motor 11 and thus fire it from the launcher 30 at the desired rate of spin for flight stability that has been created by the thrust through the nozzle inserts 27 and 28 that is created by the burning of the solid propellant 23 within the body member 17.

It should be clear, therefore, that the instant invention contemplates accelerating the spin of a rocket motor to bring it to a required speed of rotation or spin prior to the firing of the rocket motor from the launcher. It also being understood that the spin of the rocket motor be imparted thereto by an auxiliary unit as illustrated and described by the instant invention or by other means either mechanical, electrical or chemical and initiated in any well-known conventional manner.

The invention as to its manner of use, as well as its construction, should be clear to those skilled in the art, from the foregoing description and it should also be understood that variations may be made in its manner of use and construction provided such variations fall within the spirit of the invention and the scope of the appended claims.

Having thus described the invention what is claimed as new and desired to be secured by Letters Patent is:

1. The combination of a launcher fired rocket motor including a motor case having a solid propellant fuel therein and with a nozzle connected thereto at the aft end thereof and an electromotive force initiator comprising a body member connected to the motor case at the aft end thereof in circumjacent parallel relation to the nozzle, said body member having a combustion chamber and exhaust ducts therein tangential to said combustion chamber and in communication therewith, a solid propellant in said combustion chamber which when ignited will create a thrust outwardly of said ducts to cause rotation of said rocket motor, electric energy producing means mounted on said nozzle and the launcher and whereby the rotation of said rocket motor causes said electric energy producing means to create sufficient energy to ignite the solid propellant fuel in said motor case before the rocket motor is fired from the launcher.

2. The combination as in claim 1, wherein heat resistant nozzle inserts are positioned in the outer ends of the ducts in said body member.

3. The combination as in claim 1, wherein said electrical energy producing means comprises an induction coil mounted on the nozzle and a pair of permanent magnets mounted in the launcher in diametrically opposed relation to each other and said coil.

4. The combination as in claim 3, wherein electrical wires are connected to said coil to conduct said electrical energy into said motor case to ignite the solid propellant fuel therein.

No references cited.

SAMUEL W. ENGLE, *Primary Examiner.*